United States Patent
Iwata et al.

(10) Patent No.: US 10,116,177 B2
(45) Date of Patent: Oct. 30, 2018

(54) ROTOR FOR ROTARY ELECTRIC MACHINE

(71) Applicant: Mitsubishi Electric Corporation, Tokyo (JP)

(72) Inventors: Tetsuya Iwata, Tokyo (JP); Isao Sonoda, Tokyo (JP); Satoru Akutsu, Tokyo (JP); Masatsugu Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 14/910,800

(22) PCT Filed: Oct. 22, 2013

(86) PCT No.: PCT/JP2013/078582
§ 371 (c)(1),
(2) Date: Feb. 8, 2016

(87) PCT Pub. No.: WO2015/059768
PCT Pub. Date: Apr. 30, 2015

(65) Prior Publication Data
US 2016/0204666 A1    Jul. 14, 2016

(51) Int. Cl.
*H02K 1/30* (2006.01)
*H02K 1/27* (2006.01)
*H02K 1/28* (2006.01)

(52) U.S. Cl.
CPC ............ *H02K 1/278* (2013.01); *H02K 1/276* (2013.01); *H02K 1/28* (2013.01); *H02K 1/30* (2013.01);
(Continued)

(58) Field of Classification Search
CPC .......... H02K 1/278; H02K 1/276; H02K 1/28; H02K 1/30
(Continued)

(56) References Cited

U.S. PATENT DOCUMENTS 2,480,825 A * 9/1949 Friedrich ................ F16C 23/08
310/81
2,707,244 A * 4/1955 Baudry .................. H02K 9/005
310/57
(Continued)

FOREIGN PATENT DOCUMENTS

DE        9408559.5 U1    11/1994
JP        2002-58184 A    2/2002
(Continued)

OTHER PUBLICATIONS

Communication dated Jul. 27, 2017 issued by the European Patent Office in counterpart application No. 13895919.2.
(Continued)

*Primary Examiner* — Terrance Kenerly
(74) *Attorney, Agent, or Firm* — Sughrue Mion, PLLC; Richard C. Turner

(57) ABSTRACT

A rotor (1) for a rotary electric machine includes a rotor core (2) including a first core portion (20) having a plurality of core pieces (5, 6) joined together through caulking portions (2a) and a hollow first lightening portion (20a), and a second core portion (21) having a plurality of core pieces (7, 8) joined together through caulking portions (2a) and a press-fit portion (21b). A radial magnetic path width of a ring-shaped outer circumferential portion formed by laminating the first core portion (20) and the second core portion (21) changes along a circumferential direction of the rotor core (2). Therefore, a weight and an inertia can be reduced.

16 Claims, 15 Drawing Sheets

(52) U.S. Cl.
CPC ..... *H02K 2201/09* (2013.01); *H02K 2213/03* (2013.01)

(58) Field of Classification Search
USPC ...... 310/156.21, 216.137, 216.016, 216.018, 310/216.059, 216.062, 216.136
See application file for complete search history.

(56) References Cited

U.S. PATENT DOCUMENTS

| | | | |
|---|---|---|---|
| 2007/0222326 A1* | 9/2007 | Ionel .................. | H02K 1/22 310/216.067 |
| 2008/0296990 A1 | 12/2008 | Evans | |
| 2009/0115281 A1* | 5/2009 | Kimura ................ | H02K 1/24 310/216.053 |
| 2010/0026124 A1* | 2/2010 | Lu ...................... | H02K 1/278 310/156.12 |
| 2010/0192357 A1* | 8/2010 | Mitsui ................. | H02K 1/148 29/596 |
| 2011/0000079 A1* | 1/2011 | Fukumaru ........... | H02K 1/2766 29/598 |
| 2012/0098372 A1 | 4/2012 | Sajikawa | |
| 2012/0326547 A1* | 12/2012 | Suzuki ................ | H02K 1/2746 310/156.15 |
| 2013/0038151 A1* | 2/2013 | Ohashi ................ | H02K 1/32 310/59 |

FOREIGN PATENT DOCUMENTS

| | | |
|---|---|---|
| JP | 2005-102460 A | 4/2005 |
| JP | 2006-320050 A | 11/2006 |
| JP | 2007-14178 A | 1/2007 |
| JP | 2009-516997 A | 4/2009 |
| JP | 2010-187535 A | 8/2010 |
| JP | 2013-162548 A | 8/2013 |

OTHER PUBLICATIONS

International Search Report of PCT/JP2013/078582 dated Jan. 14, 2014 [PCT/ISA/210].

* cited by examiner

ROTOR FOR ROTARY ELECTRIC MACHINE

CROSS REFERENCE TO RELATED APPLICATIONS

This application is a National Stage of International Application No. PCT/JP2013/078582, filed Oct. 22, 2013, the contents of which are incorporated herein by reference in its entirety.

TECHNICAL FIELD

The present invention relates to a rotor for a rotary electric machine, including a rotor core on which a plurality of permanent magnets are arranged, which are each extended in an axial direction of the rotor core and are fixed along a circumferential direction of the rotor core.

BACKGROUND ART

In recent years, a lightweight low-inertia motor is demanded for various purposes of use.

For example, focusing on a motor for an electric power steering device to be mounted in a vehicle, a higher torque, a lighter weight, and a lower inertia are strongly demanded. The higher torque is demanded for the purpose of employing the electric power steering device for a large-sized vehicle, the lighter weight is for the purpose of improving fuel efficiency of an automobile, and the lower inertia is for the purpose of improving steering responsiveness.

A high-torque motor has an increased motor body size. Along with this, a weight and an inertia of a rotor also increase.

To cope with this, as a rotor including permanent magnets firmly fixed to an outer circumferential surface of a rotor core, there is known a rotor including lightening portions formed in portions except for an outer circumferential portion that is held in contact with the permanent magnets to reduce the weight and the inertia of the rotor so as to improve the responsiveness (see, for example, Patent Literature 1).

CITATION LIST

Patent Literature

[PTL 1] JP 2007-14178 A

SUMMARY OF INVENTION

Technical Problem

However, although the lightening portions are formed in the rotor core so that a dimension of a magnetic path width (in a radial direction of the rotor core) of the outer circumferential portion of the rotor core, which is held in contact with the permanent magnets, becomes uniform along a circumferential direction of the rotor core, the rotor having the configuration described above has a problem of insufficient reduction in weight and inertia.

The present invention has been made to solve the problem described above, and therefore has an object to provide a rotor for a rotary electric machine, which is capable of further reducing a weight and an inertia.

Solution to Problem

According to one embodiment of the present invention, there is provided a rotor for a rotary electric machine, including:
a shaft;
a rotor core through which the shaft passes, for rotating integrally with the shaft; and
a plurality of permanent magnets, each being extended in an axial direction of the rotor core and being fixed to the rotor core along a circumferential direction of the rotor core,
in which the rotor core includes:
  a first core portion including a plurality of core pieces joined together through caulking portions, and a hollow first lightening portion separated away from the shaft in a radial direction of the rotor core; and
  a second core portion including a plurality of core pieces joined together through caulking portions, and a press-fit portion held in close contact with the first core portion, into which the shaft is press-fitted, and
in which a radial width of a magnetic path of a ring-shaped outer circumferential portion formed by laminating the first core portion and the second core portion changes along the circumferential direction.

Advantageous Effects of Invention

According to the rotor for a rotary electric machine of the one embodiment of the present invention, the radial magnetic path width of the outer circumferential portion changes along the circumferential direction. Therefore, the weight and the inertia can be reduced.

DESCRIPTION OF EMBODIMENTS

Figure 1:
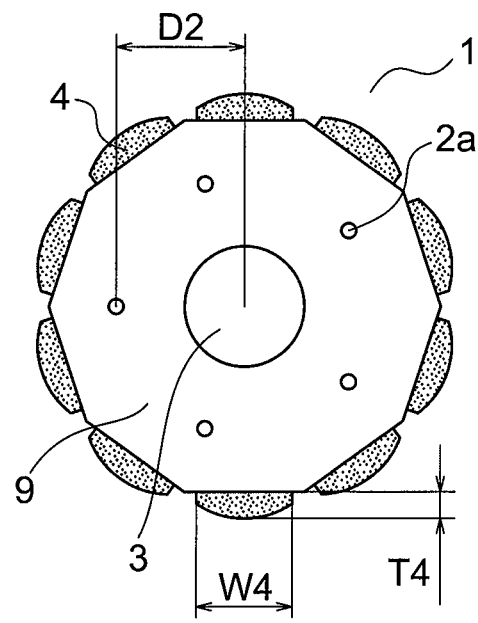
FIG. 1 is a front view of a rotor for a motor according to a first embodiment of the present invention.

Now, embodiments of the present invention are described referring to the drawings. In each of the drawings, the same or corresponding components and parts are denoted by the same reference symbols for description.

First Embodiment

Figure 2:
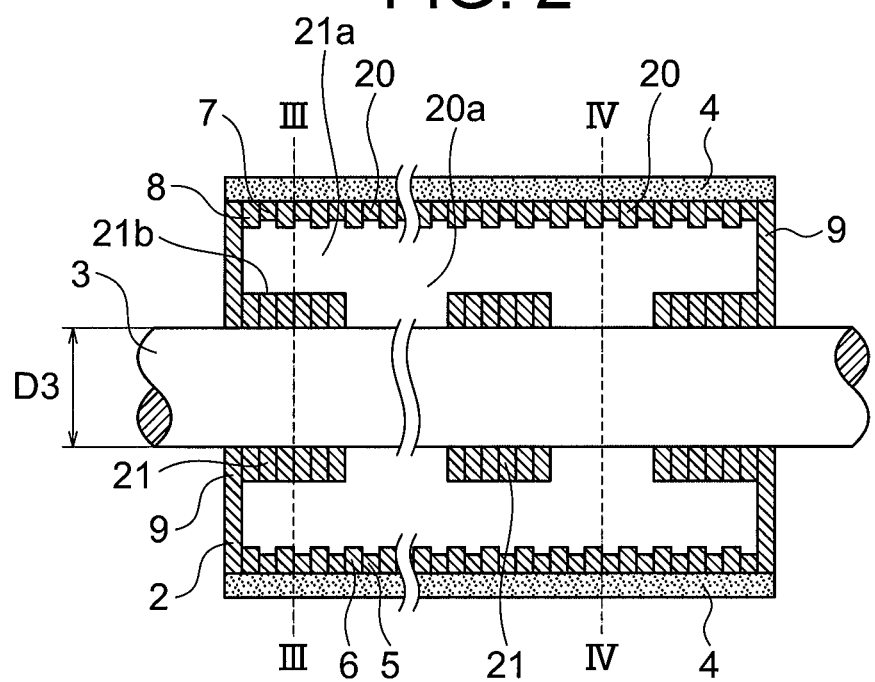
FIG. 2 is a side sectional view of FIG. 1.
Figure 3:
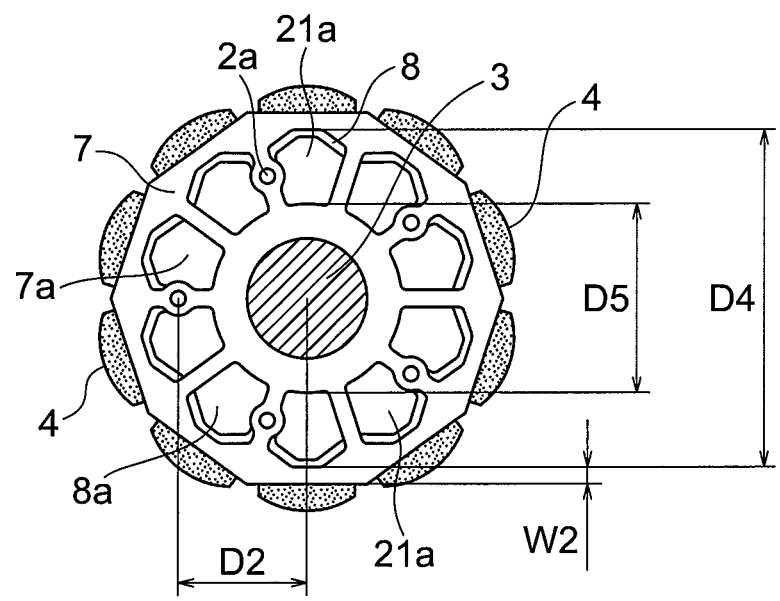
FIG. 3 is a sectional view taken along the line III-III of FIG. 2.
Figure 4:
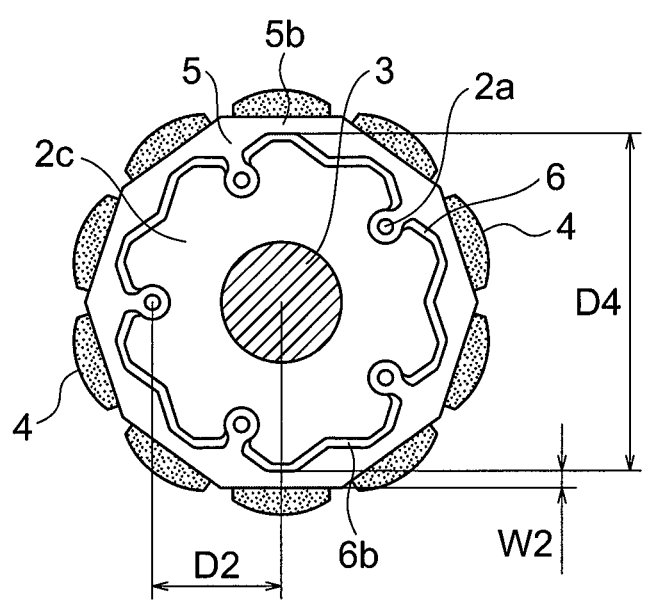
FIG. 4 is a sectional view taken along the line IV-IV of FIG. 2.

FIG. 1 is a front view of a rotor 1 for a motor according to a first embodiment of the present invention, FIG. 2 is a side sectional view of FIG. 1, FIG. 3 is a sectional view taken along the line III-III of FIG. 2, and FIG. 4 is a sectional view taken along the line IV-IV of FIG. 2.

The rotor 1 includes a shaft 3, a rotor core 2 fixed to the shaft 3 so as to be rotatable integrally therewith, and a plurality of permanent magnets 4 which are each extended in an axial direction of the rotor core 2 and are fixed equiangularly to an outer circumferential surface of the rotor core 2.

The rotor core 2 includes a pair of cover pieces 9 each being formed of a thin steel plate and having a doughnut-like shape, and first core portions 20 and second core portions 21 alternately arranged in a portion between the pair of cover pieces 9.

Figure 5:
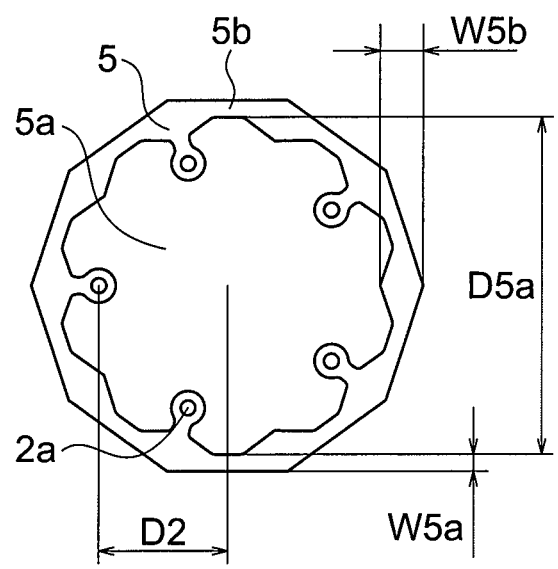
FIG. 5 is a front view of a first core piece of the first core portion illustrated in FIG. 1.
Figure 6:
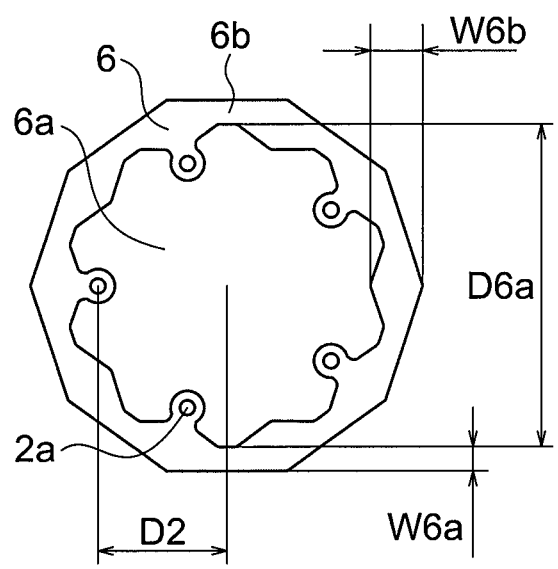
FIG. 6 is a front view of a second core piece of the first core portion illustrated in FIG. 1.

Each of the first core portions 20 is formed by alternately laminating first core pieces 5 each formed of a thin steel plate illustrated in FIG. 5, and second core pieces 6 each formed of a thin steel plate illustrated in FIG. 6.

Each of the first core portions 20 has a hollow first lightening portion 20a so as to be separated away from the shaft 3 in a radial direction of the rotor core 2. Each of the second core portions 21 has a press-fit portion 21b into which the shaft 3 is press-fitted and a plurality of second lightening portions 21a formed equiangularly around the press-fit portion 21b.

Each of the first core pieces 5 and each of the second core pieces 6 respectively have a lightening hole 5a and a lightening hole 6a each formed to have an inner diameter sufficiently larger than an outer diameter D3 of the shaft 3, caulking portions 2a formed equiangularly at five positions, and a ring-shaped outer circumferential piece portion 5b and a ring-shaped outer circumferential piece portion 6b formed at outer circumferential portions.

The lightening holes 5a and 6a are components of the first lightening portion 20a.

The first core piece 5 has an outer diameter dimension D5a for the lightening hole 5a, a minimum dimension W5a and a maximum dimension W5b for a magnetic path width (in the radial direction) of the outer circumferential piece portion 5b having a regular decagonal shape, and a dimension D2 between a center of the first core piece 5 and each of the caulking portions 2a.

The second core piece 6 has an outer diameter dimension D6a for the lightening hole 6a, a minimum dimension W6a and a maximum dimension W6b for a magnetic path width (in the radial direction) of the outer circumferential piece portion 6b having a regular decagonal shape, and a dimension D2 between the center of the second core piece 6 and each of the caulking portions 2a.

The magnetic path width of the outer circumferential piece portion 5b of the first core piece 5 is smaller over an entire circumference than the magnetic path width of the outer circumferential piece portion 6b of the second core piece 6. Therefore, the minimum dimension W5a and the maximum dimension W5b of the magnetic path width of the outer circumferential piece portion 5b of the first core piece 5 are smaller throughout the circumference than the minimum dimension W6a and the maximum dimension W6b of the magnetic path width of the outer circumferential piece portion 6b of the second core piece 6.

Figure 7:
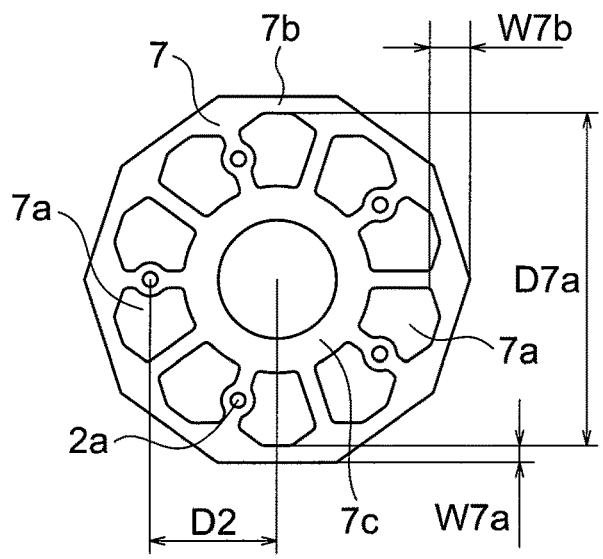
FIG. 7 is a front view of a first core piece of the second core portion illustrated in FIG. 1.
Figure 8:
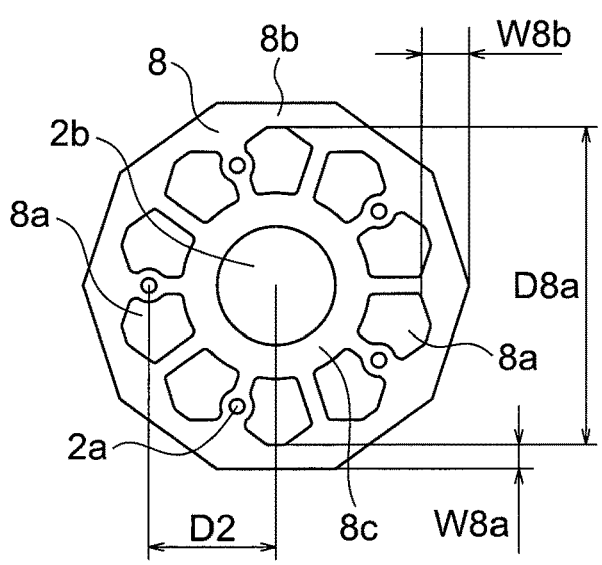
FIG. 8 is a front view of a second core piece of the second core portion illustrated in FIG. 1.

Each of the second core portions 21 is formed by alternately laminating first core pieces 7 each formed of a thin steel plate illustrated in FIG. 7, and second core pieces 8 each formed of a thin steel plate illustrated in FIG. 8.

Each of the first core pieces 7 and each of the second core pieces 8 respectively have a press-fit piece portion 7c and a press-fit piece portion 8c each having the same diameter as the outer diameter D3 of the shaft 3, into which the shaft 3 is press-fitted, and caulking portions 2a formed equiangularly at five positions.

Further, the first core piece 7 and the second core piece 8 respectively have lightening holes 7a and lightening holes 8a which each have a polygonal shape and are formed equiangularly, and a ring-shaped outer circumferential piece portion 7b and a ring-shaped outer circumferential piece portion 8b formed at outer circumferential portions.

The lightening holes 7a and 8a are components of the second lightening portion 21a, whereas the press-fit piece portions 7c and 8c are components of the press-fit portion 21b.

The first core piece 7 has a dimension D7a between outer circumferential sides of the pair of opposing lightening holes 7a, a minimum dimension W7a and a maximum dimension W7b for a magnetic path width (in the radial direction) of the outer circumferential piece portion 7b having a regular decagonal shape, and a distance D2 between a center of the first core piece 7 and each of the caulking portions 2a.

The second core piece 8 has a dimension D8a between outer circumferential sides of the pair of opposing lightening holes 8a, a minimum dimension W8a and a maximum dimension W8b for a magnetic path width (in the radial direction) of the outer circumferential piece portion 8b having a regular decagonal shape, and a distance D2 between the center of the second core piece 8 and each of the caulking portions 2a.

The magnetic path width of the outer circumferential piece portion 7b of the first core piece 7 is smaller over an entire circumference than the magnetic path width of the outer circumferential piece portion 8b of the second core piece 8. Therefore, the minimum dimension W7a and the maximum dimension W7b of the magnetic path width of the outer circumferential piece portion 7b of the first core piece 7 are smaller throughout the circumference than the minimum dimension W8a and the maximum dimension W8b of the magnetic path width of the outer circumferential piece portion 8b of the second core piece 8.

The outer circumferential piece portions 7b and 8b of the second core portion 21 and the outer circumferential piece portions 5b and 6b of the first core portion 20 have the same outer circumferential shape, and are components of the outer circumferential portion of the rotor core 2.

In the first core portion 20, the first core pieces 5 and the second core pieces 6 are alternately laminated by the caulking portions 2a located at the distance D2 from the center of the first core portion 20. In the second core portion 21, the first core pieces 7 and the second core pieces 8 are alternately laminated by the caulking portions 2a located at the distance D2 from the center.

The caulking portions 2a of the first core portion 20 are formed in inner projecting portions of the outer circumferential piece portions 5b and 6b, whereas the caulking portions 2a of the second core portion 21 are formed in connecting portions between the outer circumferential piece portion 7b and the press-fit piece portion 7c and connecting portions between the outer circumferential piece portion 8b and the press-fit piece portion 8c so as to be formed coaxially with the caulking portions 2a of the first core portion 20.

In the rotor core 2, after the first core portions 20 and the second core portions 21 are laminated alternately, both sides of the rotor core 2 are covered with the cover pieces 9.

The rotor core 2 has an inner circumferential wall surface having a convex and concave shape along the axial direction and an outer circumferential surface having a regular decagonal shape. On each part of the outer circumferential surface, the permanent magnet 4 is fixed.

At a portion immediately below the permanent magnet 4, the magnetic path widths of the core pieces 5, 6, 7, and 8 respectively have the dimensions W5a, W6a, W7a, and W8a. At a portion between the adjacent permanent magnets 4, that is, at a corner of each part of the outer circumferential surface of the rotor core 2, the magnetic path widths of the core pieces 5, 6, 7, and 8 respectively have the dimensions W5b, W6b, W7b, and W8b. The magnetic path widths of the core pieces 5, 6, 7, and 8 in the portion between the adjacent permanent magnets 4 are larger than those in the portion immediately below the permanent magnet 4.

Note that, each of the permanent magnets 4 has a width dimension W4 (in the circumferential direction) and a thickness dimension T4 (in the radial direction).

The thickness dimension T4 of each of the permanent magnets 4, the width dimension W4 of each of the permanent magnets 4, and the sizes W5a and W5b of the magnetic path width of the first core piece 5 of the first core portion 20 have a relationship of $W5a < T4 < W5b < W4$.

The thickness dimension T4 of each of the permanent magnets 4, the width dimension W4 of each of the permanent magnets 4, and the sizes W6a and W6b of the magnetic path width of the second core piece 6 of the first core portion 20 have a relationship of $W6a < T4 < W6b < W4$.

The thickness dimension T4 of each of the permanent magnets 4, the width dimension W4 of each of the permanent magnets 4, and the sizes W7a and W7b of the magnetic path width of the first core piece 7 of the second core portion 21 have a relationship of $W7a < T4 < W7b < W4$.

The thickness dimension T4 of each of the permanent magnets 4, the width dimension W4 of each of the permanent magnets 4, and the sizes W8a and W8b of the magnetic path width of the second core piece 8 of the second core portion 21 have a relationship of $W8a < T4 < W8b < W4$.

According to the rotor 1 configured as described above, in the first core portion 20, by laminating the first core pieces 5 each having the lightening hole 5a, and the second core pieces 6 each having the lightening hole 6a, the first lightening portion 20a is formed.

Therefore, the rotor 1 is reduced in inertia and weight, which enables the improvement of responsiveness of the motor and the reduction in weight of the motor.

Further, the rotor core 2 having the surface onto which the permanent magnets 4 are fixed is press-fitted over the shaft 3. The lightening hole 5a of each of the first core pieces 5 and the lightening hole 6a of each of the second core pieces 6 are set to have the dimensions sufficiently larger than the dimension D3 of the shaft 3. Therefore, the press-fit portions 21b of the second core portions 21 and the cover pieces 9 are press-fitted over and fixed to the shaft 3, whereas the first core portions 20 are not press-fitted over and fixed to the shaft 3.

Therefore, the total number of core pieces to be press-fitted and fixed is reduced. As a result, a press-fitting force at the time of press-fitting the shaft 3 into the rotor core 2 is reduced to suppress deformation, bending, and axial center runout of the shaft 3. Accordingly, the rotor 1 with high accuracy can be obtained.

Further, the lightening holes 7a and 8a are respectively formed in each of the first core pieces 7 and each of the second core pieces 8 of the second core portion 21 to be press-fitted over the shaft 3. Therefore, the inertia and the weight of the rotor 1 can be reduced.

Further, the rotor core 2 includes the cover pieces 9 and the second core portions 21 each having the press-fit portion 21b on both sides thereof. Therefore, a tilt of the rotor core 2 to be press-fitted over the shaft 3 at the time of the press-fitting is corrected. As a result, the rotor 1 with high accuracy, in which the axial core runout of the shaft 3 and the rotor core 2 is suppressed, can be obtained.

In the first core portion 20, the magnetic path widths of the outer circumferential piece portion 5b of the first core piece 5 and the outer circumferential piece portion 6b of the second core piece 6 respectively have the dimensions W5a and W6a in the vicinity of a portion on a pole center line of each of the permanent magnets 4 and the dimensions W5b and W6b in the vicinity of an inter-pole portion of the permanent magnets 4. Therefore, the magnetic path widths have different values along the circumferential direction.

Each of the permanent magnets 4 has a smaller magnetic flux density in the vicinity of the portion on the pole center line. Therefore, the portions of the first core portion 20 corresponding to the above-mentioned portions of the permanent magnets 4 can be set to have the small dimensions W5a and W6a. Specifically, the lightening hole 5a of the first core piece 5 and the lightening hole 6a of the second core piece 6 can be radially enlarged, and the rotor 1 can be correspondingly reduced in weight and inertia.

Note that, the outer circumferential piece portion 5b of the first core piece 5 and the outer circumferential piece portion 6b of the second core piece 6 of the first core portion 20 have a large magnetic flux density in the portions between the adjacent permanent magnets 4, and the dimensions W5b and W6b thereof are set larger than the dimensions W5a and W6a within a range in which magnetic saturation does not occur. In this manner, increase in cogging torque is suppressed.

Similarly to the above, also in the second core portion 21, the outer circumferential piece portion 7b of the first core piece 7 and the outer circumferential piece portion 8b of the second core piece 8 have a large magnetic flux density in the portions between the adjacent permanent magnets 4, and the dimensions W7b and W8b thereof are set larger than the dimensions W7a and W8a within a range in which magnetic saturation does not occur. In this manner, the increase in cogging torque is suppressed.

A relationship of the dimensions W5a and W5b of the magnetic path width of the outer circumferential piece portion 5b of the first core piece 5, a relationship of the dimensions W6a and W6b of the outer circumferential piece portion 6b of the second core piece 6, a relationship of the dimensions W7a and W7b of the outer circumferential piece portion 7b of the first core piece 7, and a relationship of the dimensions W8a and W8b of the magnetic path width of the outer circumferential piece portion 8b of the second core piece 8 with respect to the width dimension W4 of each of the permanent magnets 4 are set to $W5a<(½)·W4<W5b<W4$, $W6a<(½)·W4<W6b<W4$, $W7a<(½)·W4<W7b<W4$, and $W8a<(½)·W4<W8b<W4$, respectively.

As described above, the width dimension W4 of each of the permanent magnets 4 is larger than any of the dimensions of the magnetic path widths of the first core piece 5 and the second core piece 6 of the first core portion 20 and the first core piece 7 and the second core piece 8 of the second core portion 21.

The reason is as follows. The magnetic flux generated from each of the permanent magnets 4 is split into two directions toward two permanent magnets 4 adjacent thereto in the circumferential direction. Therefore, the magnetic flux density in the outer circumferential portion of the rotor core 2 at a portion between the permanent magnets 4 becomes smaller than that inside the permanent magnets 4. Therefore, the dimensions W5b, W6b, W7b, and W8b of the magnetic path widths of the outer circumferential piece portion 5b, 6b, 7b, 8b can be set smaller than the width dimension W4 of each of the permanent magnets 4. As a result, for the dimensions W5a, W6a, W7a, and W8a of the magnetic path widths in the vicinity of the center of each of the permanent magnets 4 where the magnetic flux density is smaller than that in the portion between the adjacent permanent magnets 4, the magnetic path widths can be further reduced.

By setting the magnetic path widths W5b, W6b, W7b, and W8b at the portion between the permanent magnets 4 larger than $(½)·W4$ to avoid the magnetic saturation, the increase in cogging torque can be suppressed.

Further, the lightening holes 7a and 8a can be enlarged to appropriate sizes. Therefore, the weight and the inertia can be reduced.

Further, the lightening holes 7a of the first core piece 7 and the lightening holes 8a of the second core piece 8 of the second core portion 21 are formed equiangularly so that each of the numbers thereof is the same as the number of poles of the permanent magnets 4 (ten in this embodiment). Therefore, the magnetic flux in the outer circumferential portion of the rotor core 2 has a distribution regularly changed at each predetermined angle. Therefore, the cogging torque can be reduced.

Further, each of the magnetic path widths of the outer circumferential piece portion 5b of the first core piece 5 and the outer circumferential piece portion 6b of the second core piece 6 of the first core portion 20 and the magnetic path widths of the outer circumferential piece portion 7b of the first core piece 7 and the outer circumferential piece portion 8b of the second core piece 8 of the second core portion 21 is set to be different at each predetermined angle for the number of the poles of the permanent magnets 4. The magnetic flux in the outer circumferential portion of the rotor core 2 has a distribution regularly changed at each predetermined angle. Therefore, the cogging torque can be reduced.

Further, in the first core portion 20, the first core pieces 5 and the second core pieces 6 are arranged so as to be alternately laminated one by one in the axial direction. Further, the magnetic path width of the outer circumferential piece portion 5b of the first core piece 5 is smaller over the entire circumference than the magnetic path width of the outer circumferential piece portion 6b of the second core piece 6.

Therefore, the first core portion 20 has the concave and convex shape along the axial direction and alternately different inner-diameter dimensions. By arranging the first core pieces 5 each having the smaller magnetic path width of the outer circumferential piece portion 5b, the first core portion 20 can be reduced in weight. Further, by arranging the second core pieces 6 each having the larger magnetic path width of the outer circumferential piece portion 6b, the magnetic path that is insufficient only with the arrangement of the first core pieces 5 is compensated for. As a result, the increase in cogging torque due to magnetic saturation can be prevented.

The same effects can be obtained even when a set of a plurality of the core pieces 5 and a set of a plurality of the core pieces 6 are laminated instead of the arrangement in a one-by-one manner.

Further, also in the second core portion 21, the first core pieces 7 and the second core pieces 8 are arranged so as to be alternately laminated one by one in the axial direction. Further, the magnetic path width of the outer circumferential piece portion 7b of the first core piece 7 is smaller over the entire circumference than the magnetic path width of the outer circumferential piece portion 8b of the second core piece 8.

Therefore, the second core portion 21 has the concave and convex shape along the axial direction and alternately different inner-diameter dimensions. By arranging the first core pieces 7 each having the smaller magnetic path width of the outer circumferential piece portion 7b, the second core portion 21 can be reduced in weight. Further, by arranging the second core pieces 8 each having the larger magnetic path width of the outer circumferential piece portion 8b, the magnetic path that is insufficient only with the arrangement of the first core pieces 7 is compensated for. As a result, the increase in cogging torque due to magnetic saturation can be prevented.

The same effects can be obtained even when a set of a plurality of the core pieces 7 and a set of a plurality of the core pieces 8 are laminated instead of the arrangement in a one-by-one manner.

Further, the rotor core 2 includes the cover pieces 9 on both sides, for covering the interior. Therefore, scrap metal that is generated due to bite occurring when the rotor core 2 covered with the cover pieces 9 is press-fitted over the shaft 3 and internally adhering scrap can be kept inside the rotor core 2. In this manner, the scrap generated inside the rotor core 2 can be prevented from being caught in a clearance between the rotor 1 and a stator (not shown).

The caulking portions 2a are formed in portions of the core pieces 5, 6, 7, and 8, which are located between the permanent magnets 4 and where the magnetic path width of the outer circumferential portion of the rotor core 2 is large.

In this manner, the lightening holes 5a, 6a, 7a, and 8a of the core pieces 5, 6, 7, and 8, which are located at the portions immediately below the permanent magnets 4 where the magnetic flux density is smaller can be increased without being disturbed by the caulking portions 2a. Therefore, the inertia and the weight of the rotor 1 can be reduced.

Further, when the distance between each of the caulking portions 2a of the rotor core 2 and the center of the rotor core 2 is defined as D2, the inner-diameter dimension of the press-fit portion 21b of the second core portion 21 (radial dimension of the shaft 3) is defined as D3, the radial dimension of the lightening hole 5a of the first core piece 5 is defined as D5a, the radial dimension of the lightening hole 6a of the second core piece 6 is defined as D6a, the largest distance between the pair of opposing lightening holes 7a of the first core piece 7 is defined as D7a, and the largest distance between the pair of opposing lightening holes 8a of the second core piece 8 is defined as D8a, a value of D2 is larger than a half value of D3 but is smaller than a value of half of each of the other dimensions D5a, D6a, D7a, and D8a.

In this manner, the caulking portions 2a are arranged so as not to be present in the outer circumferential portion of the rotor 2, that is, so as not to interfere with the magnetic path. As a result, the magnetic flux distribution is uniformized over the entire rotor core 2 to reduce the cogging torque.

Second Embodiment

Figure 9:
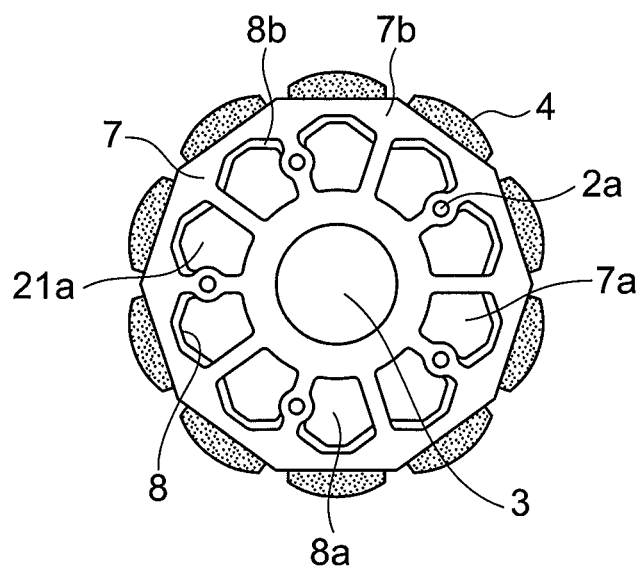
FIG. 9 is a front view of a rotor for a motor according to a second embodiment of the present invention.
Figure 10:
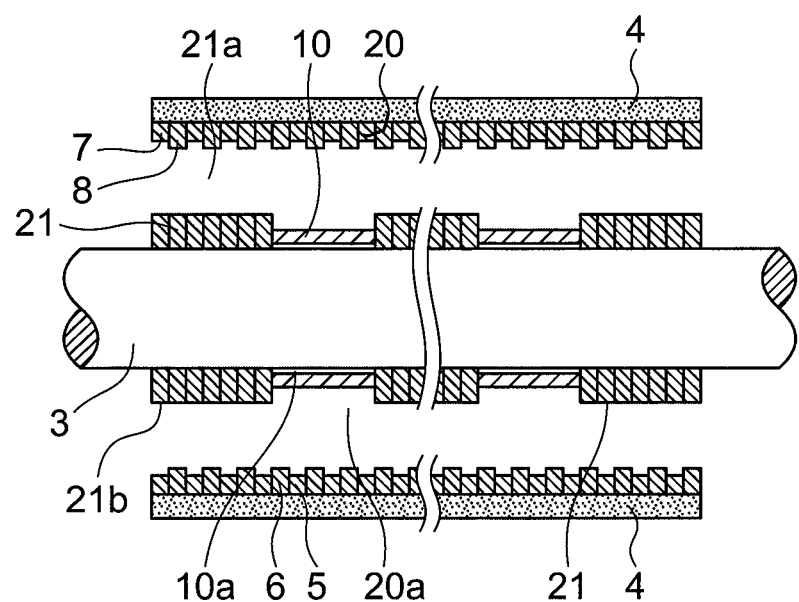
FIG. 10 is a side sectional view of FIG. 9.

FIG. 9 is a front view of a rotor 1 for a motor according to a second embodiment of the present invention, and FIG. 10 is a side sectional view of FIG. 9.

In this embodiment, the shaft 3 passing through a center axis line of the first lightening portions 20a of the first core portions 20 each being interposed between the second core portions 21 on both sides is surrounded by rings 10 through gap portions 10a therebetween instead of the cover pieces 9. Each of the rings 10 is interposed between the press-fit portions 21b of the pair of second core portions 21 adjacent to each other.

The rings 10 serve as a substitute for the cover pieces 9 of the first embodiment.

The remaining configuration is the same as that of the rotor 1 of the first embodiment.

According to the rotor 1 of this embodiment, the scrap metal or the like generated due to bite occurring when the rotor core 2 is press-fitted over the shaft 3 can be kept in the gap portions 10a of the rings 10. In this manner, the scrap metal or the like can be prevented from being caught in the clearance between the rotor 1 and the stator (not shown).

Further, the rings 10 can prevent radially inner-side portions of the second core portions 21 from being deformed in the axial direction along with the press-fitting of the shaft 3 when the rotor core 2 is press-fitted over the shaft 3 by end surfaces that come into contact with the radially inner-side portions. As a result, the rotor 1 with high accuracy can be obtained.

Third Embodiment

Figure 11:
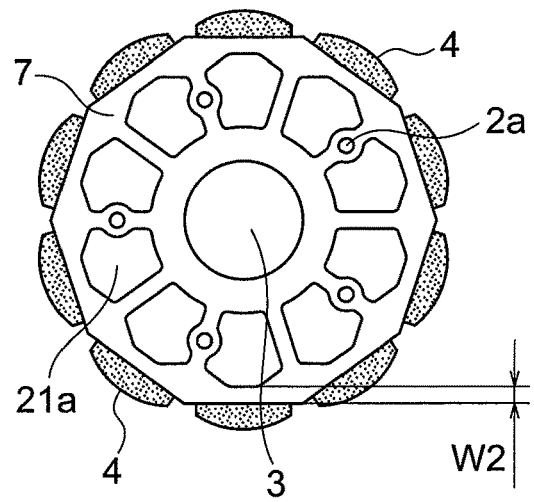
FIG. 11 is a front view of a rotor for a motor according to a third embodiment of the present invention.
Figure 12:
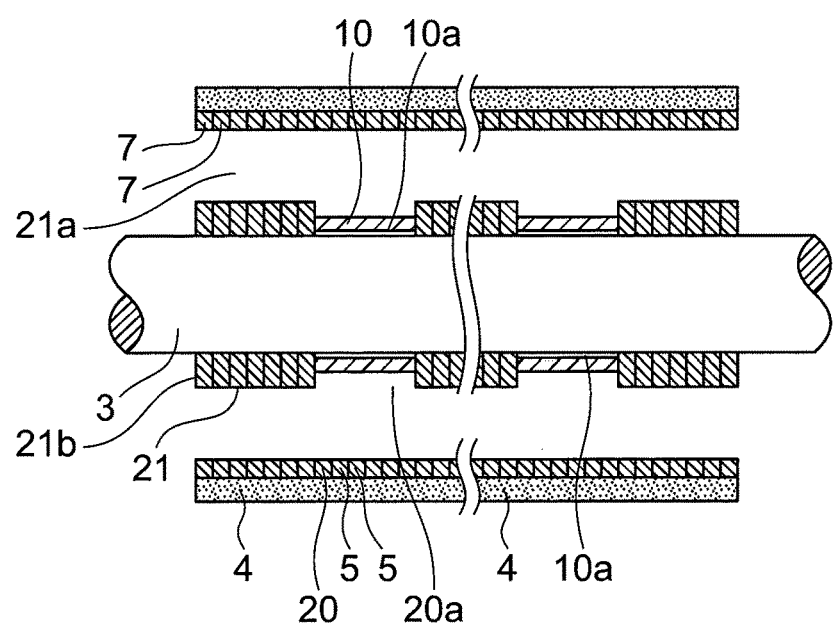
FIG. 12 is a side sectional view of FIG. 11.

FIG. 11 is a front view of a rotor 1 for a motor according to a third embodiment of the present invention, and FIG. 12 is a side sectional view of FIG. 11.

In this embodiment, the first core portion 20 is formed by laminating the first core pieces 5 having the same shape, whereas the second core portion 21 is formed by laminating the first core pieces 7 having the same shape. Specifically, the outer circumferential piece portion 5b of the first core piece 5 of the first core portion 20 and the outer circumferential piece portion 7b of the first core piece 7 of the second core portion 21 have the same width dimension. Therefore, a magnetic-path width dimension W2 of the outer circumferential portion of the rotor core 2 is the same along the axial direction.

The remaining configuration is the same as that of the rotor 1 of the second embodiment.

When the permanent magnets 4 are magnetized by a magnetizing device, the magnetic path width of the outer circumferential portion is narrowed with the reduction of the rotor core 2 in weight. As a result, magnetic flux passages for the magnetization of the permanent magnets 4 are narrowed, which requires a larger magnetic field.

On the other hand, according to the rotor 1 of this embodiment, a bar-like iron core can be smoothly inserted into an inner circumferential portion of the rotor core 2 for the magnetization of the permanent magnets 4. Further, the magnetization of the permanent magnets 4 is facilitated because of the iron core serving as a magnetic path for the passage of the magnetic flux.

Fourth Embodiment

Figure 13:
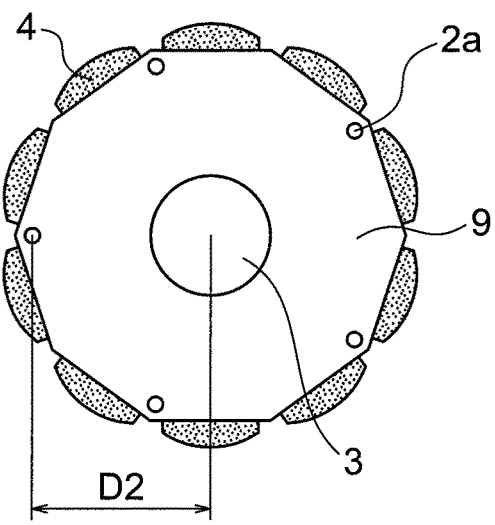
FIG. 13 is a front view of a rotor for a motor according to a fourth embodiment of the present invention.
Figure 14:
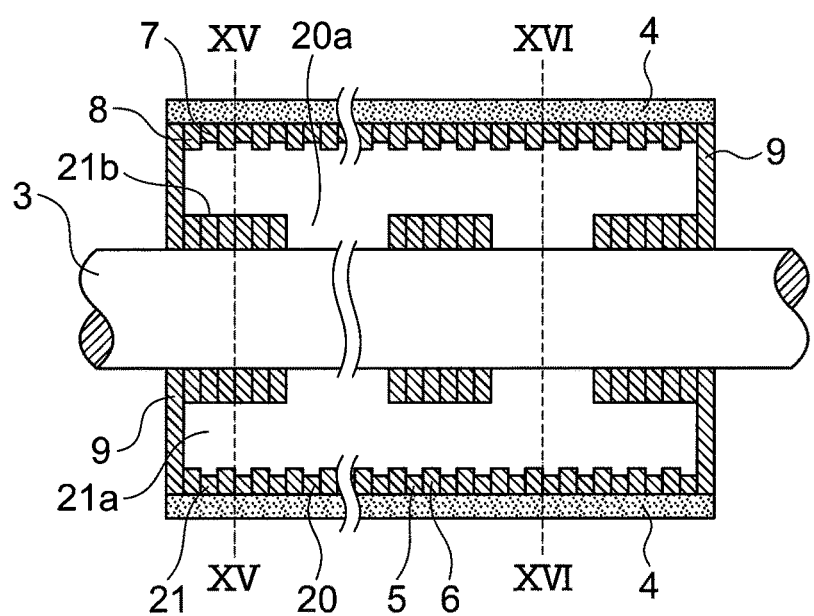
FIG. 14 is a side sectional view of FIG. 13.
Figure 15:
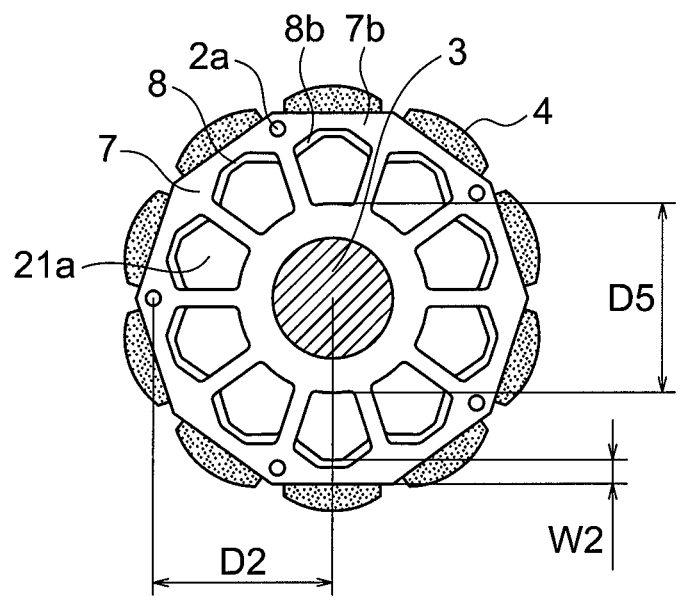
FIG. 15 is a sectional view taken along the line XV-XV of FIG. 14.
Figure 16:
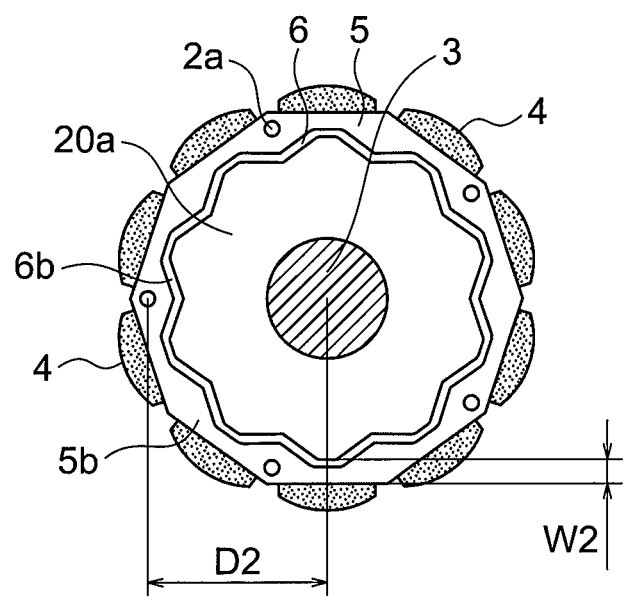
FIG. 16 is a sectional view taken along the line XVI-XVI of FIG. 15.

FIG. 13 is a front view of a rotor 1 for a motor according to a fourth embodiment of the present invention, FIG. 14 is a side sectional view of FIG. 13, FIG. 15 is a sectional view taken along the line XV-XV of FIG. 14, and FIG. 16 is a sectional view taken along the line XVI-XVI of FIG. 15.

In this embodiment, the caulking portions 2a are formed in the outer circumferential portion of the rotor core 2.

The remaining configuration is the same as that of the rotor 1 of the first embodiment.

As described above, by forming the caulking portions 2a in the magnetic path in the outer circumferential portion of the rotor core 2, the rotor 1 that is reduced in weight and inertia by integrating the outer circumferential portion serving as the magnetic path and the caulking portions 2a can be obtained.

Fifth Embodiment

Figure 17:
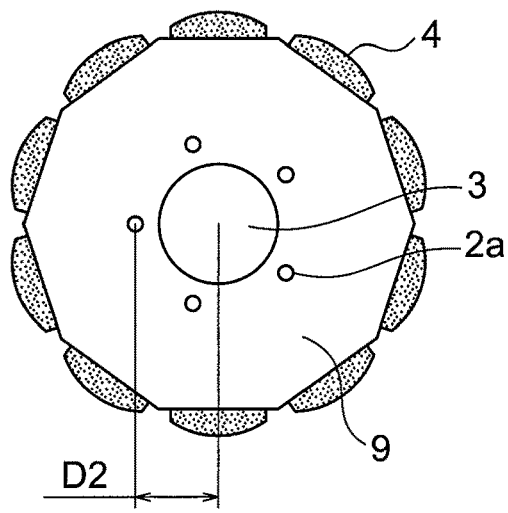
FIG. 17 is a front view of a rotor for a motor according to a fifth embodiment of the present invention.
Figure 18:
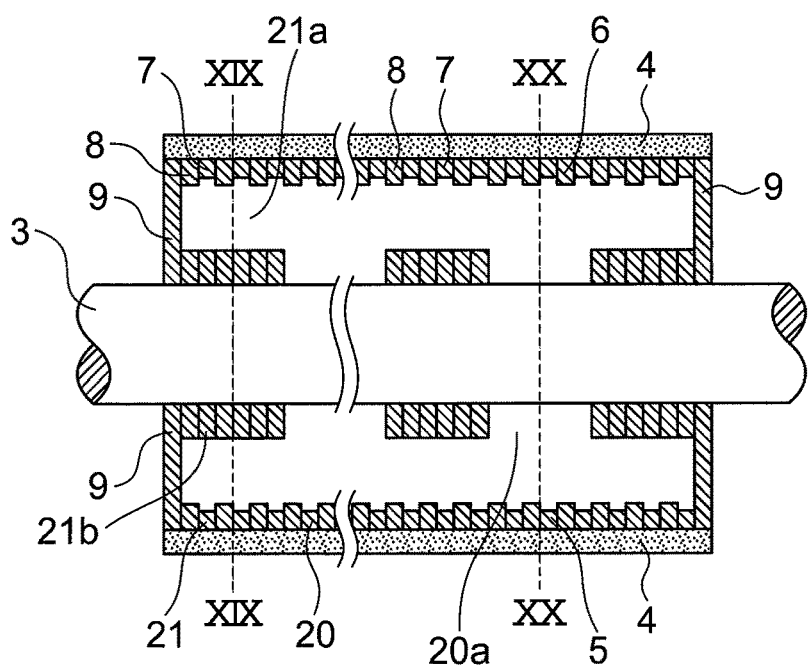
FIG. 18 is a side sectional view of FIG. 17.
Figure 19:
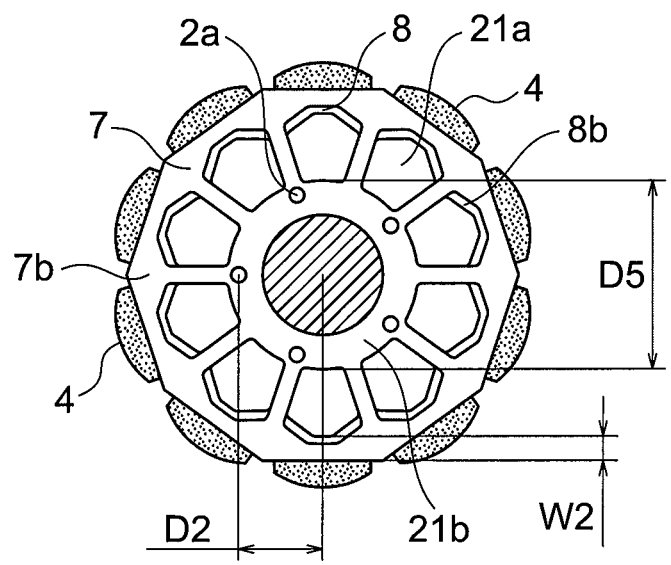
FIG. 19 is a sectional view taken along the line XIX-XIX of FIG. 18.
Figure 20:
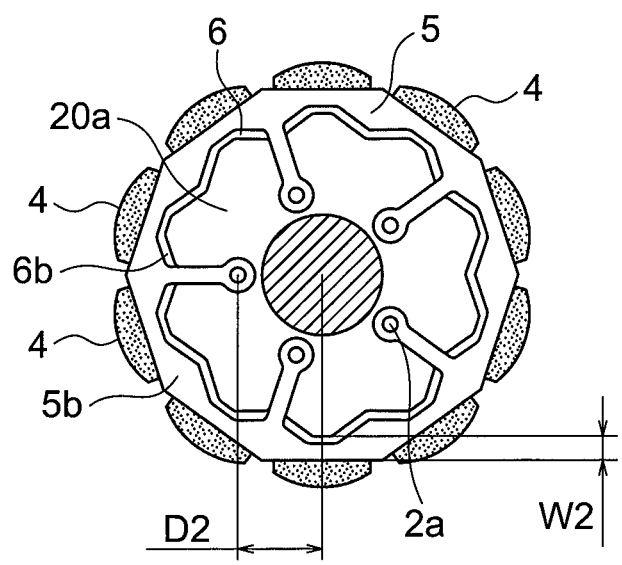
FIG. 20 is a sectional view taken along the line XX-XX of FIG. 18.

FIG. 17 is a front view of a rotor 1 for a motor according to a fifth embodiment of the present invention, FIG. 18 is a side sectional view of FIG. 17, FIG. 19 is a sectional view taken along the line XIX-XIX of FIG. 18, and FIG. 20 is a sectional view taken along the line XX-XX of FIG. 18.

In this embodiment, the caulking portions 2a of the second core portions 21 are formed in press-fit piece portions 7c and 8c of the press-fit portions 21b of the second core portions 21. The caulking portions 2a of the first core portions 20 are formed in the first core pieces 5 and the second core pieces 6 on the same axis lines as the caulking portions 2a of the second core portions 21.

The remaining configuration is the same as that of the rotor 1 of the first embodiment.

By forming the caulking portions 2a of the second core portion 21 in the press-fit portion 21b as described above, the rotor 1 that is reduced in weight and inertia by integrating the first core pieces 7 and the second core pieces 8 through the press-fit portions 21b in the second core portion 21 can be obtained.

Sixth Embodiment

Figure 21:
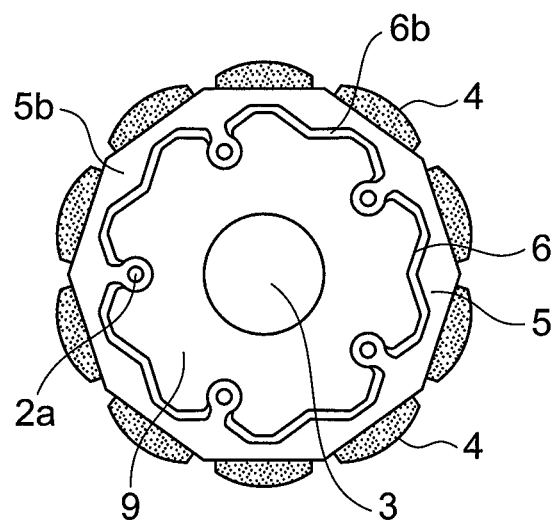
FIG. 21 is a front view of a rotor for a motor according to a sixth embodiment of the present invention.
Figure 22:
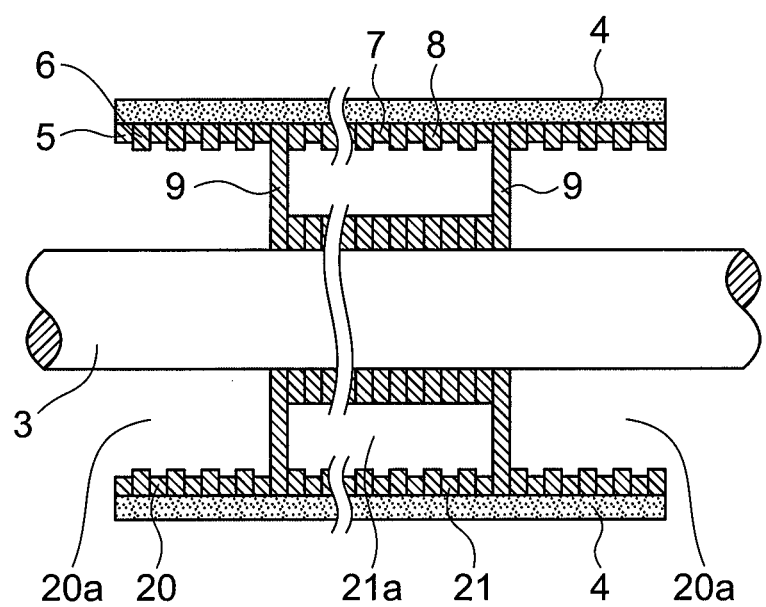
FIG. 22 is a side sectional view of FIG. 21.

FIG. 21 is a front view of a rotor 1 for a motor according to a sixth embodiment of the present invention, and FIG. 22 is a side sectional view of FIG. 21.

In this embodiment, both sides of the second core portion 21 interposed between the first core portions 20 are covered with the cover pieces 9.

The remaining configuration is the same as that of the rotor 1 of the first embodiment.

This rotor 1 can provide the same effects as those of the rotor of the first embodiment in which the cover pieces 9 are provided on both sides thereof.

Seventh Embodiment

Figure 23:
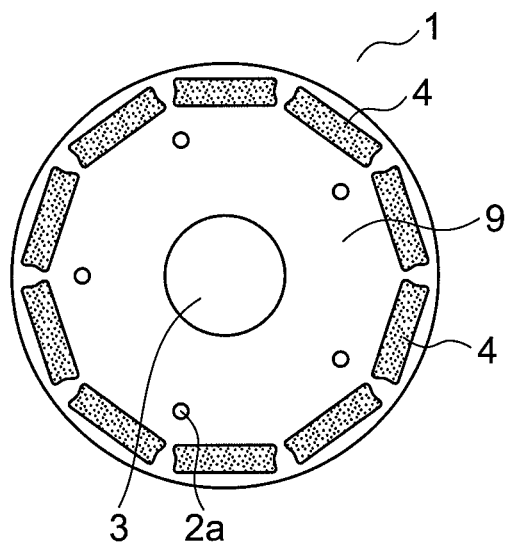
FIG. 23 is a front view of a rotor for a motor according to a seventh embodiment of the present invention.
Figure 24:
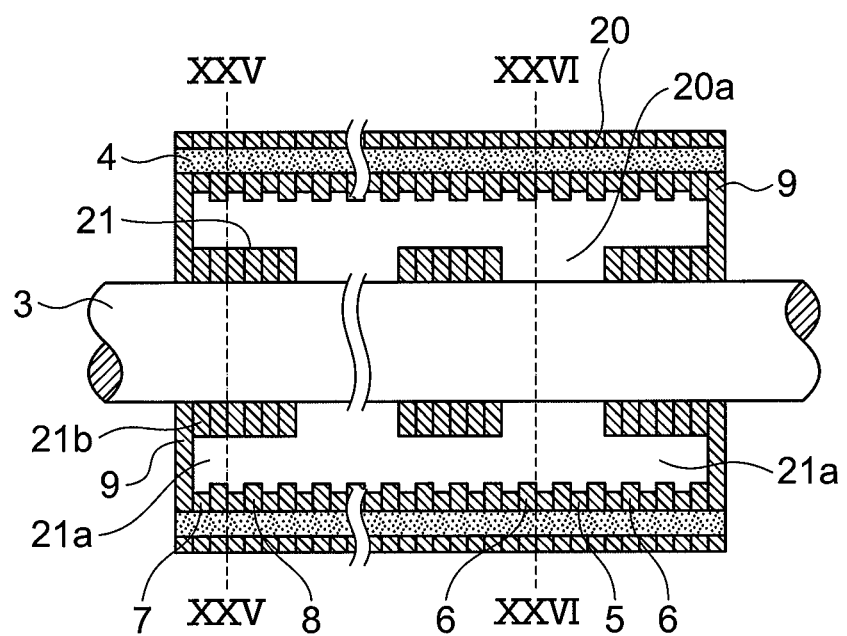
FIG. 24 is a side sectional view of FIG. 23.
Figure 25:
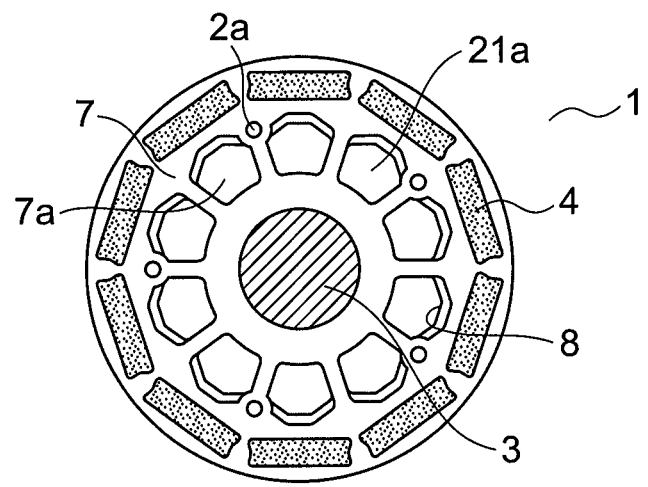
FIG. 25 is a sectional view taken along the line XXV-XXV of FIG. 24.
Figure 26:
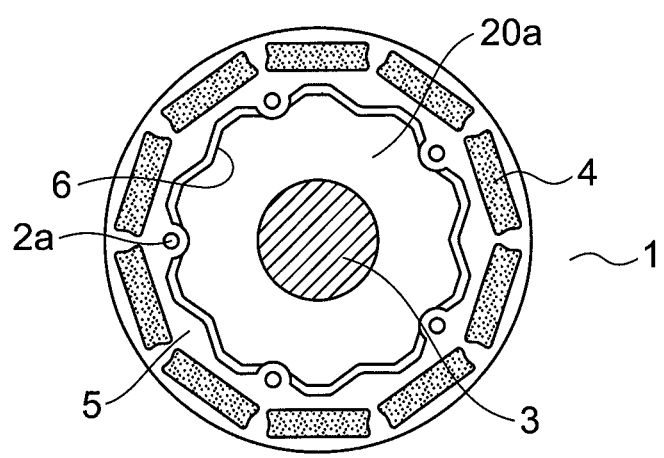
FIG. 26 is a sectional view taken along the line XXVI-XXVI of FIG. 24.

FIG. 23 is a front view of a rotor 1 for a motor according to a seventh embodiment of the present invention, FIG. 24 is a side sectional view of FIG. 23, FIG. 25 is a sectional view taken along the line XXV-XXV of FIG. 24, and FIG. 26 is a sectional view taken along the line XXVI-XXVI of FIG. 24.

The rotor 1 of this embodiment is an IPM-type rotor in which the permanent magnets 4 are embedded.

Although the arrangement of the permanent magnets 4 is different from that of the rotor 1 of the first embodiment, the remaining configuration is the same as that of the rotor 1 of the first embodiment.

Note that, any of the rotors 1 according to the second to sixth embodiments described above may be applied to the IPM type rotor, and the same effects as those of the rotor 1 of the first embodiment can be obtained for each rotor.

Eighth Embodiment

Figure 27:
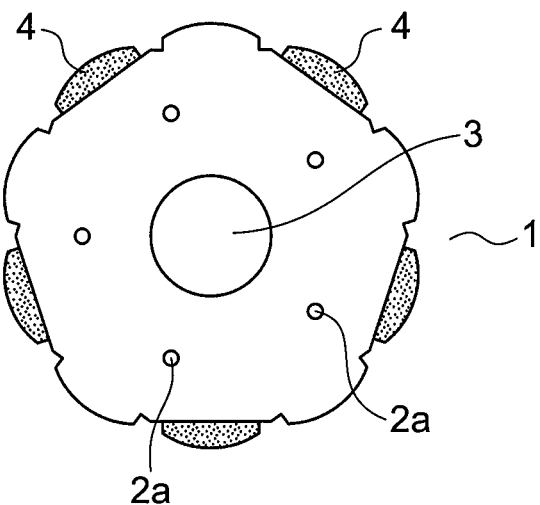
FIG. 27 is a front view of a rotor for a motor according to an eighth embodiment of the present invention.
Figure 28:
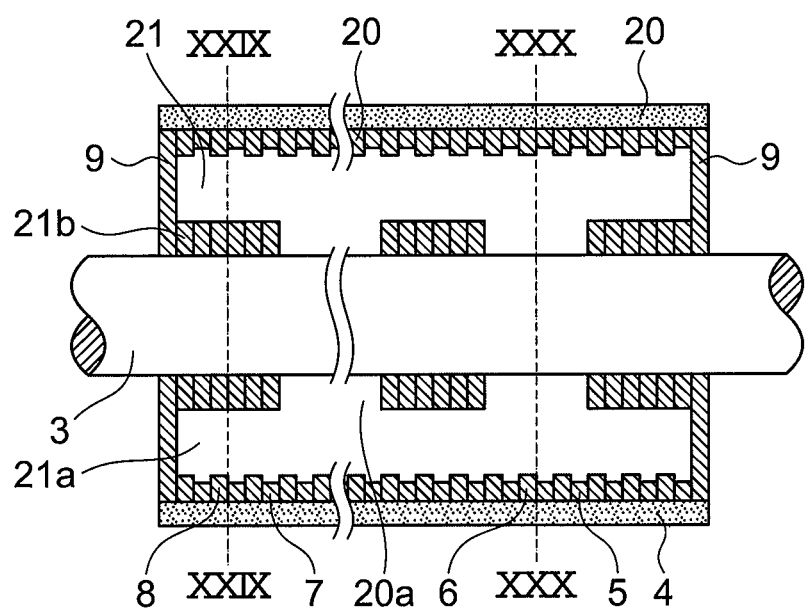
FIG. 28 is a side sectional view of FIG. 27.
Figure 29:
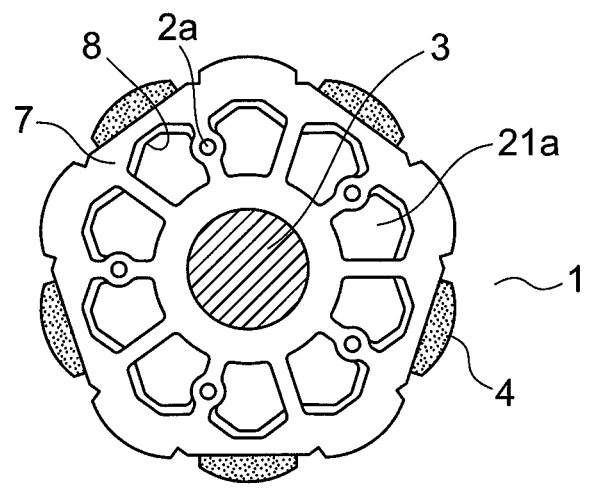
FIG. 29 is a sectional view taken along the line XXIX-XXIX of FIG. 28.
Figure 30:
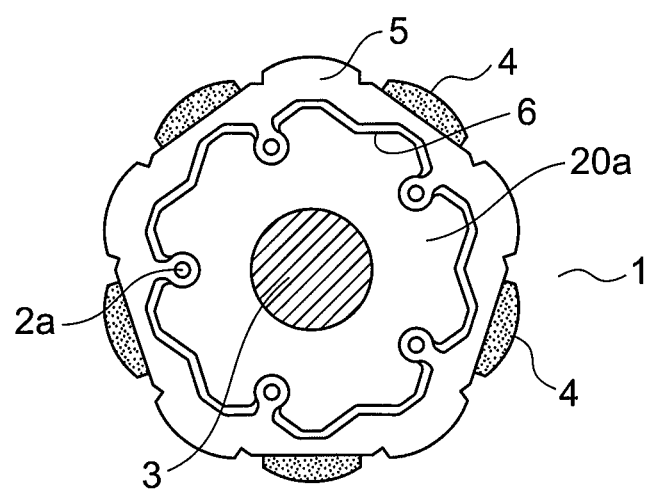
FIG. 30 is a sectional view taken along the line XXX-XXX of FIG. 28.

FIG. 27 is a front view of a rotor 1 for a motor according to an eighth embodiment of the present invention, FIG. 28 is a side sectional view of FIG. 27, FIG. 29 is a sectional view taken along the line XXIX-XXIX of FIG. 28, and FIG. 30 is a sectional view taken along the line XXX-XXX of FIG. 28.

The rotor 1 of this embodiment is a consequent-pole rotor in which the N-poles of the permanent magnets 4 are all oriented outward.

The rotor of this embodiment also has the same configuration as that of the rotor 1 of the first embodiment.

Note that, any of the rotors 1 according to the second to sixth embodiments described above may be applied to the consequent-pole rotor, and the same effects as those of the rotor 1 of the first embodiment can be obtained for each rotor.

Note that, although the rotor 1 for a motor is described as the rotor for a rotary electric machine in each of the embodiments described above, the present invention is also applicable to a rotor for a power generator. In this case, the effects of improving power generation efficiency can be obtained by reducing the weight and the inertia.

REFERENCE SIGNS LIST 1 rotor, 2 rotor core, 2a caulking portion, 3 shaft, 4 permanent magnet, 5 first core piece, 5a lightening hole, 5b outer circumferential piece portion, 6 second core piece, 6a lightening hole, 6b outer circumferential piece portion, 7 first core piece, 7a lightening hole, 7b outer circumferential piece portion, 7c press-fit piece portion, 8 second core piece, 8a lightening hole, 8b outer circumferential piece portion, 8c press-fit piece portion, 9 cover piece, 10 ring, 10a gap portion, 20 first core portion, 20a first lightening portion, 21 second core portion, 21a second lightening portion, 21b press-fit portion.

The invention claimed is:

1. A rotor for a rotary electric machine, comprising:
a shaft;
a rotor core through which the shaft passes, for rotating integrally with the shaft; and
a plurality of permanent magnets, each being extended in an axial direction of the rotor core and being fixed to the rotor core along a circumferential direction of the rotor core,
wherein the rotor core comprises:
a first core portion comprising a plurality of core pieces joined together through caulking portions, and a hollow first lightening portion separated away from the shaft in a radial direction of the rotor core; and
a second core portion comprising a plurality of core pieces joined together through caulking portions, and a press-fit portion held in close contact with the first core portion, into which the shaft is press-fitted,
wherein a radial width of a magnetic path of a ring-shaped outer circumferential portion formed by laminating the first core portion and the second core portion changes along the circumferential direction, and
wherein the shaft passing through a center axis line of the hollow first lightening portion of the first core portion is surrounded by a ring through a gap portion therebetween.

2. A rotor for a rotary electric machine according to claim 1, wherein the second core portion comprises second core portions arranged on both sides of the shaft.

3. A rotor for a rotary electric machine according to claim 1, wherein the second core portion has hollow second lightening portions formed around the press-fit portion.

4. A rotor for a rotary electric machine according to claim 3, wherein the hollow second lightening portions are formed equiangularly so that a number of the hollow second lightening portions is the same as a number of the plurality of permanent magnets.

5. A rotor for a rotary electric machine according to claim 1, wherein the radial width of the magnetic path of the ring-shaped outer circumferential portion is larger at a portion between adjacent permanent magnets than a portion immediately below each of the plurality of permanent magnets.

6. A rotor for a rotary electric machine according to claim 1, wherein the radial width of the magnetic path of the ring-shaped outer circumferential portion changes equiangularly.

7. A rotor for a rotary electric machine according to claim 1, wherein the caulking portions are each formed in a portion immediately below the portion between the adjacent permanent magnets.

8. A rotor for a rotary electric machine according to claim 1, wherein the caulking portions of the second core portion are formed in portions connecting the press-fit portion and the ring-shaped outer circumferential portion, whereas the caulking portions of the first core portion are formed coaxially with the caulking portions of the second core portion.

9. A rotor for a rotary electric machine according to claim 1, wherein the caulking portions of the first core portion and the caulking portions of the second core portion are formed in the ring-shaped outer circumferential portion.

10. A rotor for a rotary electric machine according to claim 1, wherein the caulking portions of the second core portion are formed in portions of the press-fit portion, whereas the caulking portions of the first core portion are formed coaxially with the caulking portions of the second core portion.

11. A rotor for a rotary electric machine according to claim 1, wherein the plurality of core pieces of the first core portion and the plurality of core pieces of the second core portion comprise two types of core pieces corresponding to a large core piece and a small core piece having outer circumferential piece portions of different width dimensions, the outer circumferential piece portions serving as components of the magnetic path, and wherein each of the first core portion and the second core portion comprises a laminate of the single large core piece and the single small core piece or a set of a plurality of the large core pieces and a plurality of the small core pieces laminated alternately.

12. A rotor for a rotary electric machine according to claim 1, wherein the plurality of core pieces of the first core portion and the plurality of core pieces of the second core portion respectively include outer circumferential piece portions having the same width dimension, the outer circumferential piece portions serving as components of the magnetic path.

13. A rotor for a rotary electric machine according to claim 1, wherein the rotor core comprises cover pieces for covering both sides of the rotor core.

14. A rotor for a rotary electric machine according to claim 1, wherein the first core portion comprises first core portions, and wherein the second core portion interposed between the first core portions comprises cover pieces for covering both sides of the second core portion.

15. A rotor for a rotary electric machine according to claim 1, wherein the rotor for a rotary electric machine comprises an IPM-type rotor.

16. A rotor for a rotary electric machine according to claim 1, wherein the rotor for a rotary electric machine comprises a consequent-pole rotor.

* * * * *